(12) United States Patent
Tang et al.

(10) Patent No.: US 8,768,695 B2
(45) Date of Patent: Jul. 1, 2014

(54) CHANNEL NORMALIZATION USING RECOGNITION FEEDBACK

(75) Inventors: Yun Tang, Montreal (CA); Venkatesh Nagesha, Wayland, MA (US)

(73) Assignee: Nuance Communications, Inc., Burlington, MA (US)

( * ) Notice: Subject to any disclaimer, the term of this patent is extended or adjusted under 35 U.S.C. 154(b) by 205 days.

(21) Appl. No.: 13/495,509

(22) Filed: Jun. 13, 2012

(65) Prior Publication Data

US 2013/0339014 A1 Dec. 19, 2013

(51) Int. Cl.
*G10L 19/14* (2006.01)
*G10L 15/00* (2013.01)

(52) U.S. Cl.
USPC .......................................... 704/234; 704/231

(58) Field of Classification Search
CPC ..... G10L 15/142; G10L 15/22; G10L 15/063; G10L 15/14; G10L 15/144
USPC .................................................. 704/231–257
See application file for complete search history.

(56) References Cited

U.S. PATENT DOCUMENTS

| | | | | |
|---|---|---|---|---|
| 6,377,924 | B1* | 4/2002 | Gong et al. | 704/256.4 |
| 2002/0091521 | A1* | 7/2002 | Yuk et al. | 704/240 |
| 2003/0204398 | A1* | 10/2003 | Haverinen et al. | 704/233 |
| 2005/0182621 | A1* | 8/2005 | Zlokarnik et al. | 704/224 |
| 2006/0009972 | A1* | 1/2006 | Yuk et al. | 704/234 |
| 2010/0262423 | A1* | 10/2010 | Huo et al. | 704/233 |
| 2011/0208521 | A1* | 8/2011 | McClain | 704/233 |

* cited by examiner

*Primary Examiner* — Samuel G Neway
(74) *Attorney, Agent, or Firm* — Banner & Witcoff, Ltd.

(57) ABSTRACT

A computer-implemented arrangement is described for performing cepstral mean normalization (CMN) in automatic speech recognition. A current CMN function is stored in a computer memory as a previous CMN function. The current CMN function is updated based on a current audio input to produce an updated CMN function. The updated CMN function is used to process the current audio input to produce a processed audio input. Automatic speech recognition of the processed audio input is performed to determine representative text. If the audio input is not recognized as representative text, the updated CMN function is replaced with the previous CMN function.

15 Claims, 2 Drawing Sheets

CHANNEL NORMALIZATION USING RECOGNITION FEEDBACK

FIELD OF THE INVENTION

The invention generally relates to automatic speech recognition (ASR), and more specifically, to channel mean normalization for ASR-based dictation applications.

BACKGROUND ART

An automatic speech recognition (ASR) system determines a semantic meaning of input speech. Typically, the input speech is processed into a sequence of digital speech feature frames. Each speech feature frame can be thought of as a multi-dimensional vector that represents various characteristics of the speech signal present during a short time window of the speech. In a continuous recognition system, variable numbers of speech frames are organized as "utterances" representing a period of speech followed by a pause, which in real life loosely corresponds to a spoken sentence or phrase.

The ASR system compares the input speech frames to find statistical models that best match the speech feature characteristics and determine a corresponding representative text or semantic meaning associated with the statistical models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

In cloud-based (client-server) ASR, the speech recognizer at the server is exposed to speech data acquired from many different devices and in various acoustic environments and from different applications such as messaging or voice search. Device type, microphone type (and position on the device) as well as acoustic environment have an influence on the observed audio. To a somewhat lesser degree, application type has this effect as it affects speaking style and the way users generally hold and operate the device. All these effects will result in significant variation in the individual input channels in cloud-based ASR systems. Besides cloud-based ASR arrangements, desktop ASR dictation applications face similar issues.

Speech recognition systems typically employ a technique called Cepstral Mean Normalization (CMN) on the input sequence of speech features in order to improve robustness to mismatches in input channel conditions. In general terms, CMN involves calculating the cepstral mean across the utterance and then subtracting it from each frame. There are many different variations to implement CMN effectively; for example, for ASR systems that run in real time online (i.e. with minimal latency incurred) a filter or windowing approach is used.

SUMMARY OF THE INVENTION

Embodiments of the present invention include a computer-implemented arrangement for performing cepstral mean normalization (CMN) in automatic speech recognition. A current CMN function is stored in a computer memory as a previous CMN function. The current CMN function is updated based on a current audio input to produce an updated CMN function. The updated CMN function is used to process the current audio input to produce a processed audio input. Automatic speech recognition of the processed audio input is performed to determine representative text. If the audio input is not recognized as representative text, the updated CMN function is replaced with the previous CMN function.

The process is repeated each time a new audio input is received from the speaker user and may be performed in real time with minimal response latency. The automatic speech recognition may be based on a cloud-based ASR arrangement or a desktop-based ASR dictation application.

DETAILED DESCRIPTION OF SPECIFIC EMBODIMENTS

Embodiments of the present invention are directed to techniques to improve ASR system robustness to channel model mismatches based on improved normalization of speech features. Most existing CMN algorithms intend to model the local characteristics without specific knowledge of acoustic conditions. Such so-called blind CMN algorithms can go astray under some circumstances such as during periods of no speech or other atypical interactions with the system. This often results in poor recognition accuracy.

Embodiments of the present invention uses the recognition results to identify atypical interactions that lead the CMN function astray and then retract the CMN updates based on the identified atypical interactions. For example, the speech recognition system may have a separate, parallel component that determines whether or not recognizable speech is present in an input utterance, or whether or not an input utterance is from the target speaker, or if a user repeatedly uses the same phrase (e.g., commands). The identification decision made by the system can then be used to determine that the input utterance was an atypical interaction (or at least not a desirable basis for adaptation of the CMN function) and therefore should not be used to update the channel state.

A commercial dictation application may estimate and adapt the CMN transform function from speech data generated while operating. But it is not desirable to use silence, non-speech or background speech as the basis for changing the CMN. Moreover, the system is not perfect at identifying whether not the current input contains speech for recognition. It may mislabel background conversation as input speech and adapt the CMN towards that background conversation. This degrades the desired operation of the CMN function.

A commercial dictation application also commonly provides recognition feedback when operating. For example, input utterances received after a "go-to-sleep" command will be labeled as UTTERANCE_REJECTED if the utterance is not recognized as a command Removing such UTTERANCE_REJECTED inputs from CMN adaptation process can obtain about 1% WERR (Word Error Rate Relative Reduction). If non-dictation utterances are removed, about 1.5% WERR is expected.

Figure 1:
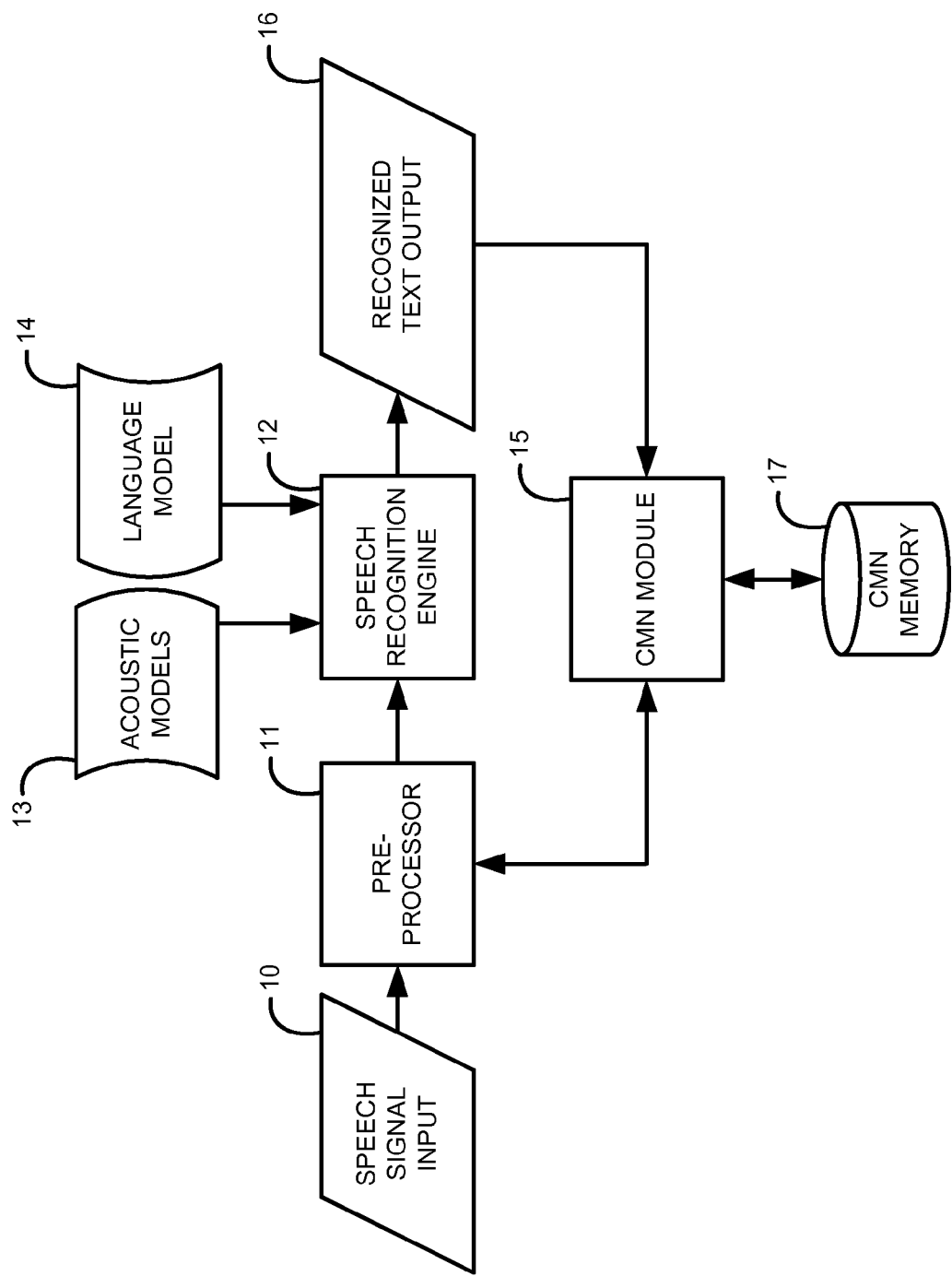
FIG. 1 shows an example of ASR system according to one embodiment of the present invention.
Figure 2:
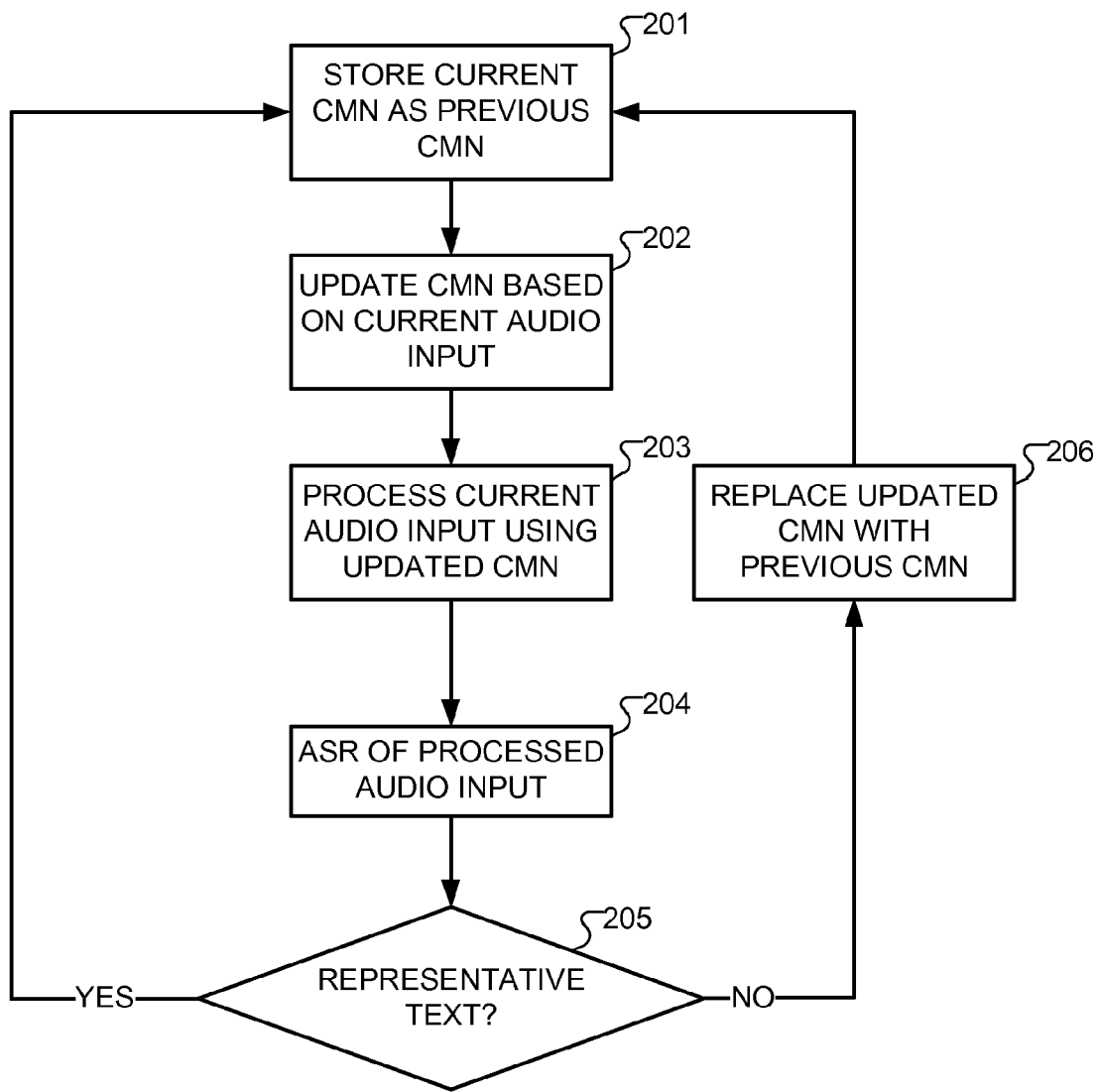
FIG. 2 shows various logical steps in a method of front end speech feature processing according to an embodiment of the present invention.

FIG. 1 shows various functional blocks and FIG. 2 shows various logical steps in an automatic speech recognition dictation arrangement (e.g., a cloud-based ASR arrangement or a desktop-based dictation application) which benefits from an embodiment of the present invention. A speech signal input module 10 receives a speech input from a user and converts it into a representative electrical signal. For example, this may be based on the use of a conventional microphone. Pre-processor 11 is a computer process on at least one hardware implemented processor that initially converts the speech input signal into a sequence of multi-dimensional speech feature vectors ("speech frames"). The speech recognition engine 12 is a set of computer processes on at least one hardware implemented processor that compare the sequence of speech frames to various acoustic models 13 and a language model 14 to determine a representative recognized text output 16 that corresponds to the speech input.

During system operation (e.g., in real time with minimal response latency), a cepstral mean normalization (CMN) module 15 stores a current CMN function in CMN memory 17 as a previous CMN function, step 201. The CMN module 15 then updates the current CMN function based on the current audio input at the pre-processor 11, step 202, to produce an updated CMN function which is used to process the current audio input speech frames—that is, to apply the updated CMN function to normalize the incoming speech features to produce a processed audio input, step 203. Recognition engine 12 performs automatic speech recognition of the processed audio input to determine representative text, step 204. If the recognition engine 12 does not recognize the processed audio input as recognized text 16, step 205, then the CMN module 15 replaces the updated CMN function the previous CMN function in CMN memory 17, step 206. The process is repeated each time a new audio input is received from the speaker user.

Existing CMN algorithms do not model drastic changes to acoustic conditions very well and recovery from mismatched conditions is very slow. And while recognition feedback/transcription has been used in most model parameter adaptation schemes (e.g., MLLR, MAP, etc.), recognition feedback has not been used before for channel mean normalization, much less an approach as described herein that uses a pure retraction of the updated CMN function rather than some more complicated calculation.

In one set of experiments with a state of the art speaker-dependent dictation system, a 1.5% average accuracy improvement was observed using these new CMN techniques. And it was common to observe about 5% WER (Word Error Rate) reduction during periods of user transition, e.g. when the user restarts the system after a period of no activity.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as preprogrammed hardware elements, other related components, or as a combination of hardware and software components.

Embodiments can be implemented as a computer program product for use with a computer system, for example, as a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A computer-implemented method employing at least one hardware implemented computer processor for performing cepstral mean normalization (CMN) in automatic speech recognition comprising:
   storing a current CMN function in a computer memory as a previous CMN function;
   updating the current CMN function based on a current audio input to produce an updated CMN function;
   using the updated CMN function to process the current audio input to produce a processed audio input;
   attempting to perform automatic speech recognition of the processed audio input to determine representative text;
   if the processed audio input is not recognized as representative text, replacing the updated CMN function with the previous CMN function.

2. A method according to claim 1, further comprising:
   repeating the process each time a new audio input is received from the speaker user.

3. A method according to claim 1, wherein the process is performed in real time with minimal response latency.

4. A method according to claim 1, wherein the step of performing automatic speech recognition is based on a cloud-based ASR arrangement.

5. A method according to claim 1, wherein the step of performing automatic speech recognition is based on a desktop-based ASR arrangement.

6. A computer program product encoded in a non-transitory computer-readable medium for performing cepstral mean normalization (CMN) in automatic speech recognition, the product comprising:
- program code for storing a current CMN function in a computer memory as a previous CMN function;
- program code for updating the current CMN function based on a current audio input to produce an updated CMN function;
- program code for using the updated CMN function to process the current audio input to produce a processed audio input;
- program code for attempting to perform automatic speech recognition of the processed audio input to determine representative text;
- program code for, if the processed audio input is not recognized as representative text, replacing the updated CMN function with the previous CMN function.

7. A product according to claim 6, further comprising:
- program code for repeating the performing of the cepstral mean normalization each time a new audio input occurs.

8. A product according to claim 6, wherein the performing of the cepstral mean normalization is performed in real time with minimal response latency.

9. A product according to claim 6, wherein the program code for performing automatic speech recognition uses a cloud-based ASR arrangement.

10. A product according to claim 6, wherein the program code for performing automatic speech recognition uses a desktop-based ASR arrangement.

11. An automatic speech recognition system comprising:
- a cepstral mean normalization (CMN) module employing at least one hardware implemented computer processor for:
  - i. storing a current CMN function in a computer memory as a previous CMN function, and
  - ii. updating the current CMN function based on a current audio input to produce an updated CMN function;
- an audio pre-processor for normalizing the current audio input using the updated CMN function to produce a processed audio input; and
- a speech recognition engine employing at least one hardware implemented computer processor for attempting to perform automatic speech recognition of the processed audio input to determine representative text;
- wherein if the processed audio input is not recognized as representative text, the CMN module replaces the updated CMN function with the previous CMN function.

12. A system according to claim 11, wherein the system repeats the cepstral mean normalization each time a new audio input occurs.

13. A system according to claim 11, wherein the system performs the cepstral mean normalization in real time with minimal response latency.

14. A system according to claim 11, wherein the system uses a cloud-based ASR arrangement.

15. A system according to claim 11, wherein the system uses a desktop-based ASR arrangement.

* * * * *